(12) United States Patent
Oh et al.

(10) Patent No.: US 12,425,646 B2
(45) Date of Patent: Sep. 23, 2025

(54) ENCODING AND DECODING METHOD AND APPARATUS FOR IMMERSIVE VIDEO

(71) Applicant: ELECTRONICS AND TELECOMMUNICATIONS RESEARCH INSTITUTE, Daejeon (KR)

(72) Inventors: Kwan Jung Oh, Daejeon (KR); Gwang Soon Lee, Daejeon (KR); Hong Chang Shin, Yongin-si (KR); Jun Young Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 97 days.

(21) Appl. No.: 18/300,900

(22) Filed: Apr. 14, 2023

(65) Prior Publication Data

US 2023/0396803 A1    Dec. 7, 2023

(30) Foreign Application Priority Data

Jun. 2, 2022 (KR) .................. 10-2022-0067558

(51) Int. Cl.

| | |
|---|---|
| *H04N 19/597* | (2014.01) |
| *G06T 5/00* | (2024.01) |
| *G06T 5/77* | (2024.01) |
| *H04N 19/167* | (2014.01) |
| *H04N 19/177* | (2014.01) |

(52) U.S. Cl.
CPC ............ *H04N 19/597* (2014.11); *G06T 5/77* (2024.01); *H04N 19/167* (2014.11); *H04N 19/177* (2014.11)

(58) Field of Classification Search
CPC .. H04N 19/597; H04N 19/167; H04N 19/177; H04N 19/105; H04N 19/184; H04N 19/70; G06T 5/77
USPC ........................................................ 375/240
See application file for complete search history.

(56) References Cited

U.S. PATENT DOCUMENTS

| | | | |
|---|---|---|---|
| 2021/0005016 A1* | 1/2021 | Oh .......................... | G06T 9/001 |
| 2021/0092346 A1* | 3/2021 | Lee ....................... | H04N 21/816 |
| 2021/0329209 A1 | 10/2021 | Lee et al. | |
| 2021/0383122 A1 | 12/2021 | Jeong et al. | |
| 2022/0284665 A1* | 9/2022 | Garvey ................. | G06T 15/005 |
| 2023/0103929 A1* | 4/2023 | Navasardyan ............ | G06T 5/60 |
| | | | 382/159 |

(Continued)

FOREIGN PATENT DOCUMENTS

| | | |
|---|---|---|
| KR | 10-2021-0006307 | 1/2021 |
| KR | 10-2021-0035060 | 3/2021 |
| KR | 10-2021-0084242 | 7/2021 |

OTHER PUBLICATIONS

Kim et al. A Method of Improving Image Compression Efficiency Using Reinforcement Learning-Based Padding of Inactive Region. School of Electronics and Information Engineering, Korea Aerospace University. Feb. 2021.

*Primary Examiner* — Susan E. Hodges
(74) *Attorney, Agent, or Firm* — KILE PARK REED & HOUTTEMAN PLLC (57) ABSTRACT

A method is for encoding/decoding an immersive image, and the method for encoding an immersive image may include extracting an invalid region from an already encoded atlas and encoding a current atlas by referring to the invalid region.

7 Claims, 10 Drawing Sheets

(56) References Cited

U.S. PATENT DOCUMENTS

2023/0306563 A1* 9/2023 Yu .................. G06V 10/771

* cited by examiner

ENCODING AND DECODING METHOD AND APPARATUS FOR IMMERSIVE VIDEO

CROSS REFERENCE TO RELATED APPLICATION

The present application claims priority to a Korean patent application 10-2022-0067558, filed Jun. 2, 2022, the entire contents of which are incorporated herein for all purposes by this reference.

BACKGROUND OF THE INVENTION

Field of the Invention

The present disclosure relates to an encoding/decoding method and apparatus for immersive video and, more particularly, to a method and apparatus for encoding/decoding an invalid region of immersive video.

Description of the Related Art

Currently, the Moving Picture Experts Group (MPEG) is standardizing the MPEG Immersive Video (MIV) standard for providing an immersive media service with 6 degrees of freedom (DoF). MIV receives a multiview color and depth image as an input, makes an atlas, that is, a new form of image information with inter-view correlation being removed, and encodes/decodes the atlas by using an existing image compression standard. An atlas image is an image combined as a single piece of image information where a pruning technique is used to construct only a part other than a region renderable in a different view in a unit called patch.

An atlas may have a valid region and an invalid region. Although an invalid region is an unnecessary region, a video codec performs encoding/decoding without distinguishing valid and invalid regions, which results in degradation of coding efficiency. Accordingly, in order to solve this problem, techniques of applying a hole filling technique or a filling technique to an invalid region have been devised.

SUMMARY

An object of the present disclosure is to provide an encoding/decoding method and apparatus for immersive video.

Another object of the present disclosure is to provide an atlas-based image encoding/decoding method and apparatus.

Another object of the present disclosure is to provide a method and apparatus for effectively encoding/decoding an invalid region of an atlas-based image.

Another object of the present disclosure is to provide a recording medium storing a bitstream generated by an encoding/decoding method and apparatus for immersive video.

According to an embodiment of the present disclosure, a method for encoding an immersive image may include extracting an invalid region from an already encoded atlas and encoding a current atlas by referring to the invalid region.

The extracting of the invalid region may include obtaining occupancy map information of the already encoded atlas and excluding a valid region of the already encoded atlas by masking the occupancy map information.

The encoding of the current atlas may include copying the extracted invalid region of the already encoded atlas into an invalid region of the current atlas.

The copying of the invalid region may be performed recursively.

The already encoded atlas may be derived by using a frame that is first encoded among frames of a group of pictures (GOP) including the current atlas image.

In case the current atlas is derived through a first frame of an image, the invalid region may be derived by using a background filling technique, and the background filling technique may be at least one of a push-pull based background filling technique, a sparse linear model-based background filling technique and a harmonic based background filling technique.

The method for encoding an immersive image further includes determining whether or not to encode the current atlas by using an invalid region that is extracted from the already encoded atlas and encoding, based on the determination, information indicating whether or not to encode the current atlas by using an invalid region that is extracted from the already encoded atlas.

According to another embodiment of the present disclosure, a method for decoding an immersive image may include extracting an invalid region from an already decoded atlas and decoding a current atlas by referring to the invalid region.

The extracting of the invalid region may include obtaining occupancy map information of the already decoded atlas and excluding a valid region of the already decoded atlas by masking the occupancy map information.

The decoding of the current atlas may include copying the extracted invalid region of the already decoded atlas into an invalid region of the current atlas.

The copying of the invalid region may be performed recursively.

The already decoded atlas may be derived by using a frame that is first decoded among frames of a group of pictures (GOP) including the current atlas image.

In case the current atlas is derived through a first frame of an image, the invalid region may be derived by using a background filling technique, and the background filling technique may be at least one of a push-pull based background filling technique, a sparse linear model-based background filling technique and a harmonic based background filling technique.

The method for decoding an immersive image may further include decoding information indicating whether or not to decode the current atlas by using an invalid region that is extracted from the already decoded atlas and decoding the current atlas based on the information.

In a computer-readable recording medium storing a bitstream including image encoding data that is encoded according to a method for encoding an immersive image according to another embodiment of the present disclosure, the method for encoding an immersive image may include extracting an invalid region from an already encoded atlas and encoding a current atlas by referring to the invalid region.

The extracting of the invalid region may include obtaining occupancy map information of the already encoded atlas and excluding a valid region of the already encoded atlas by masking the occupancy map information.

The encoding of the current atlas may include copying the extracted invalid region of the already encoded atlas into an invalid region of the current atlas.

According to the present disclosure, it is possible to provide an encoding/decoding method and apparatus for immersive video.

In addition, according to the present disclosure, it is possible to provide an atlas-based image encoding/decoding method and apparatus.

In addition, according to the present disclosure, an invalid region of an atlas-based image may be effectively encoded/decoded.

In addition, according to the present disclosure, it is possible to provide a recording medium storing a bitstream that is generated by a method and apparatus for encoding/decoding an immersive video.

BRIEF DESCRIPTION OF THE DRAWINGS

FIG. 7 is a view for describing an immersive image encoding device according to some embodiments of the present disclosure.

DETAILED DESCRIPTION OF THE INVENTION

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. In describing each view, a similar reference sign is used for a similar component.

Terms like 'first,' 'second', etc. may be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term "and/or" includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present application, it is to be understood that terms such as "including," "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, embodiments of the present invention will be described in detail with reference to the accompanying drawings. Hereinafter, the same constituent elements in the drawings are denoted by the same reference numerals, and a repeated description of the same elements will be omitted.

Immersion can be defined as a phenomenon of obscuring appearance and reality, and immersive media may include video or audio media that enable a user to experience immersive feelings. For example, immersive media may mean media for enhancing immersive feelings in various types of visual environments including diverse VR (virtual reality) devices like head mounted display (HMD), augmented reality (AR) and glasses and large display like multi TV.

In particular, MPEG has carried out immersive video standardization under the project called MPEG-I led by such groups as Requirement, Visual and system since October 2016. The ultimate aim of MPEG-I is to standardize video, audio and system techniques necessary for immersive media services that support up to 6DoF, and the standardization is in progress under the title of MPEG Immersive Video (MIV).

Degrees of Freedom may be classified into a stage of Phase 1a (3DoF) supporting 3-axis rotary motions around a fixed center, a stage of Phase 1b (3DoF+) supporting a constrained translational motion like a slight head movement based on a plurality of images including an omnidirectional scene and a plurality of visual images synthesized from the images, and a stage of Phase 2 (6DoF) enabling as free movement in a media environment as in real life.

Figure 1:
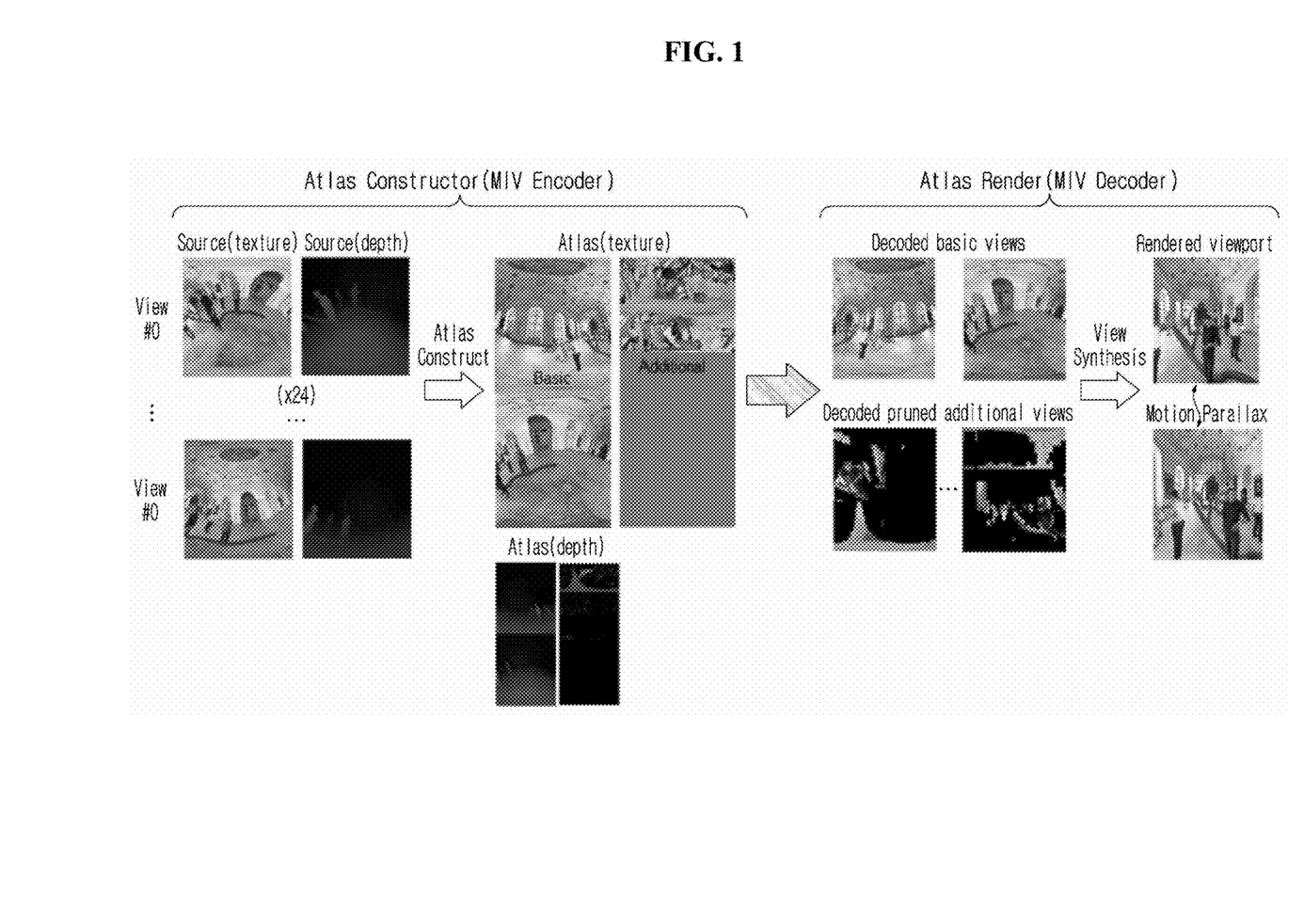
FIG. 1 is a view for describing a method for encoding/decoding an immersive image.

FIG. 1 is a view for describing a method for encoding/decoding an immersive image.

An immersive image may be encoded/decoded through multiview color and depth images obtained from various positions to support 6DoF.

As an example, an immersive image may be encoded/decoded as illustrated in FIG. 1. Some views in a multiview image may be determined as a basic view. Information on every basic view is encoded/decoded, while among the remaining additional views, a region that cannot be rendered from a basic view may be defined as a patch. Then, patches may form an atlas, and encoding/decoding may be performed.

Figure 2:
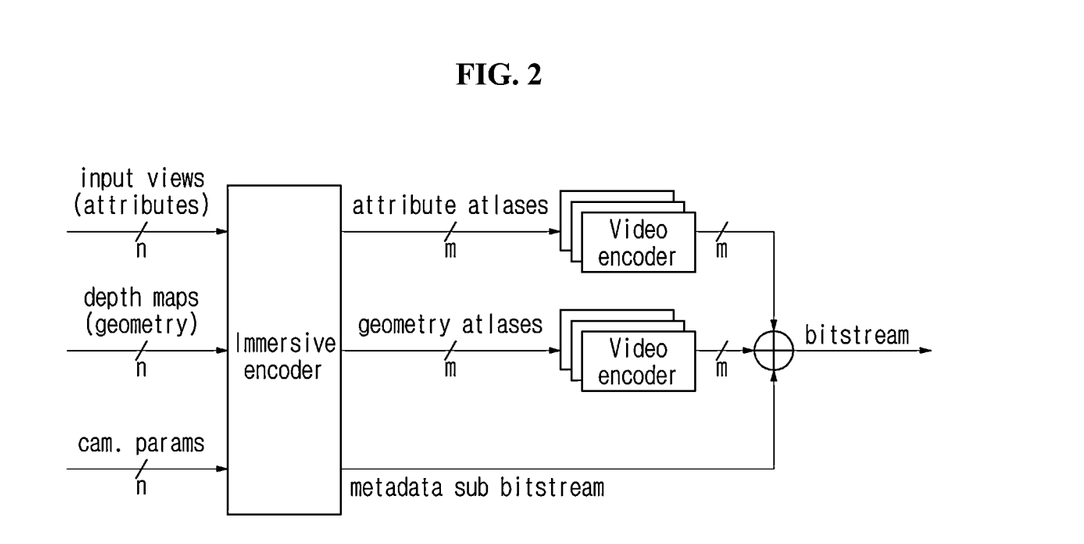
FIG. 2 is a view for describing an immersive image encoding device.
Figure 3:
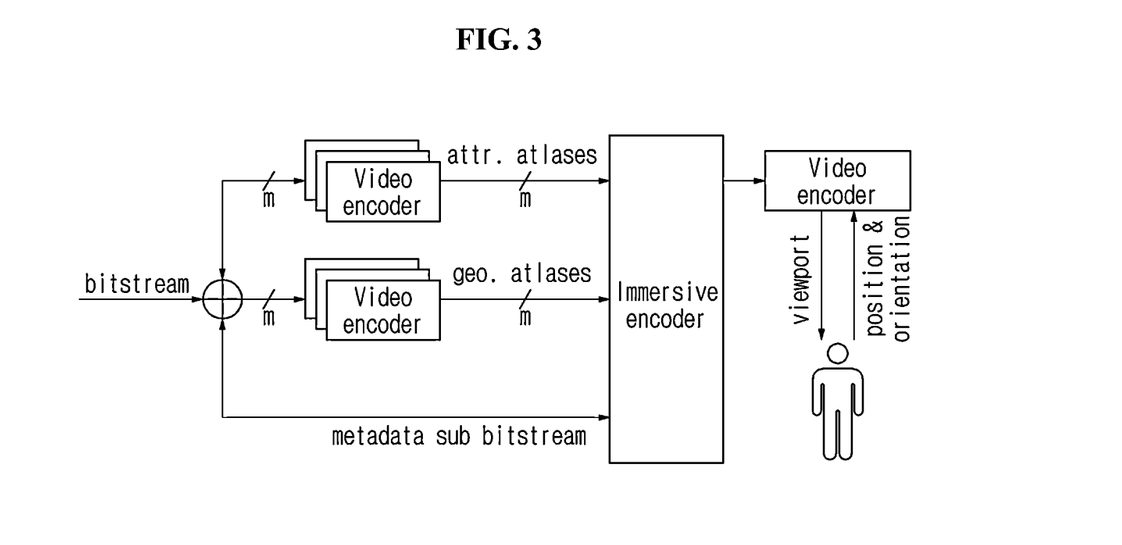
FIG. 3 is a view for describing an immersive image decoding device.

FIG. 2 is a view for describing an immersive image encoding device, and FIG. 3 is a view for describing an immersive image decoding device.

FIG. 2 and FIG. 3 illustrate block diagrams for an immersive image encoding device and an immersive image decoding device.

Referring to FIG. 2, an immersive image encoding device may include an immersive encoder and an image encoder for encoding a conventional 2-dimensional image codec. Based on at least one of an input view for color, a depth map and a camera parameter, the immersive encoder may be generate at least one of an atlas image and additional metadata for color and depth images. In the description below, color may mean attribute information for a view. In addition, depth may mean geometry information of an image. Accordingly, an atlas image for color and an atlas image for depth may mean an attribute atlas and a geometry atlas respectively. By using the image encoder, an attribute atlas and a geometry atlas, which are generated by the immersive encoder, may be encoded into a bitstream.

Referring to FIG. 3, an immersive image decoding device may include an immersive decoder and an image decoder for decoding a conventional 2-dimensional image codec. The immersive decoder may decode an immersive image based on at least one of an attribute atlas, a geometry atlas, and a sub bitstream including metadata. An image encoder may generate at least one of an attribute atlas and a geometry atlas by receiving a bitstream as an input.

An atlas image encoded/decoded by an immersive encoder and an immersive decoder may have a different feature from a conventional two-dimensional image. Patches derived from an additional view of an atlas may have different shapes, and there may be a valid region occupied by a patch and an invalid region that is not a patch. In addition, since a valid region and an invalid region are distinguished by a boundary, data of a boundary region has a high-frequency component. As this is a feature that is not considered in a conventional two-dimensional image, it reduces encoding/decoding efficiency of an atlas image. According to some embodiments of the present disclosure, such reduction of efficiency in encoding/decoding an atlas image may be improved.

Figure 4:
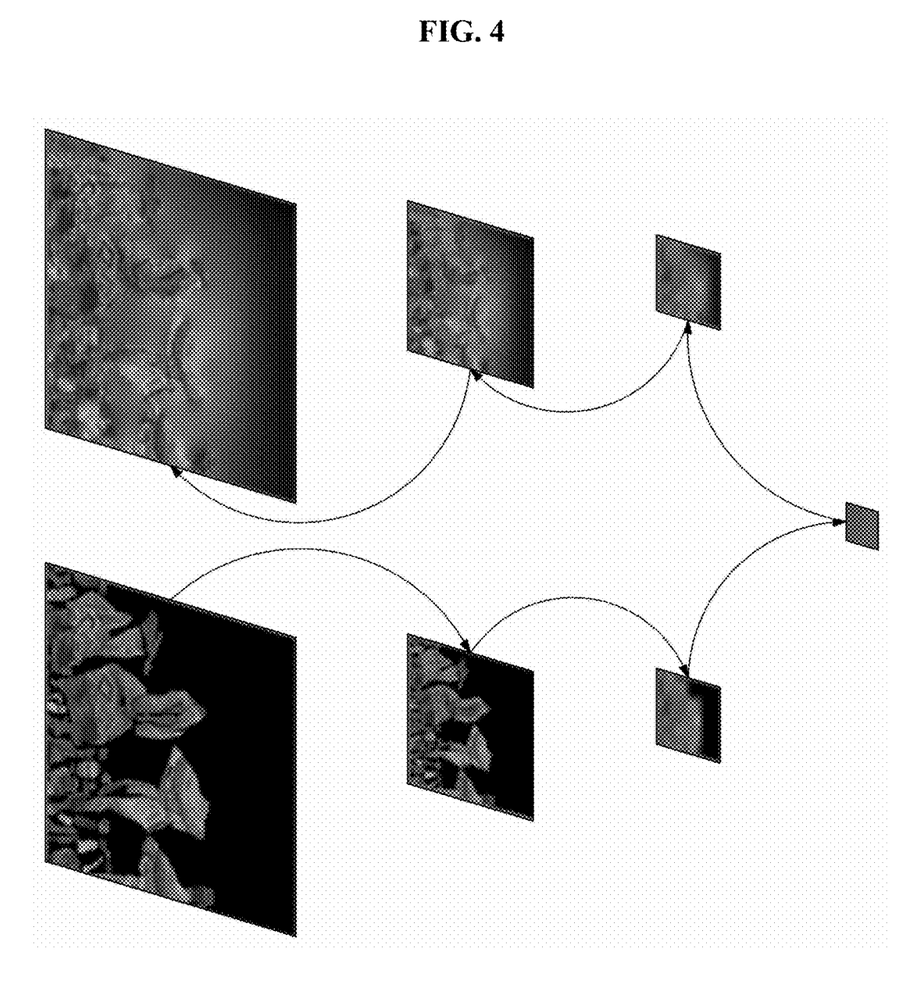
FIG. 4 is a view for describing a conventional background filling technique.

FIG. 4 is a view for describing a conventional background filling technique.

According to a conventional background filling technique, an invalid region of a patch may be derived by using at least one of valid regions of the patch. Background filling methods based on push-pull, sparse linear model and harmonic and the like are conventional methods of deriving an invalid region. By deriving an invalid region from a valid region, a high-frequency image of an atlas image may be reduced, and encoding/decoding efficiency may be improved. Herein, an immersive decoding device may distinguish a valid region and an invalid region through occupancy information or occupancy map information.

However, in a conventional method, there still remains a problem of unnecessary bit rates and errors caused by encoding for a residual signal of an invalid region. In addition, in a block-based image encoding/decoding scheme, there still remains a problem caused by encoding/decoding for a block that includes both a valid region and an invalid region.

In addition, when background filling for an invalid region is performed in each frame, a temporal correlation for the invalid region may be lowered so that an unnecessary bit rate can additionally occur. In order to solve a problem of the related art, the present disclosure proposes the following embodiment.

Figure 5:
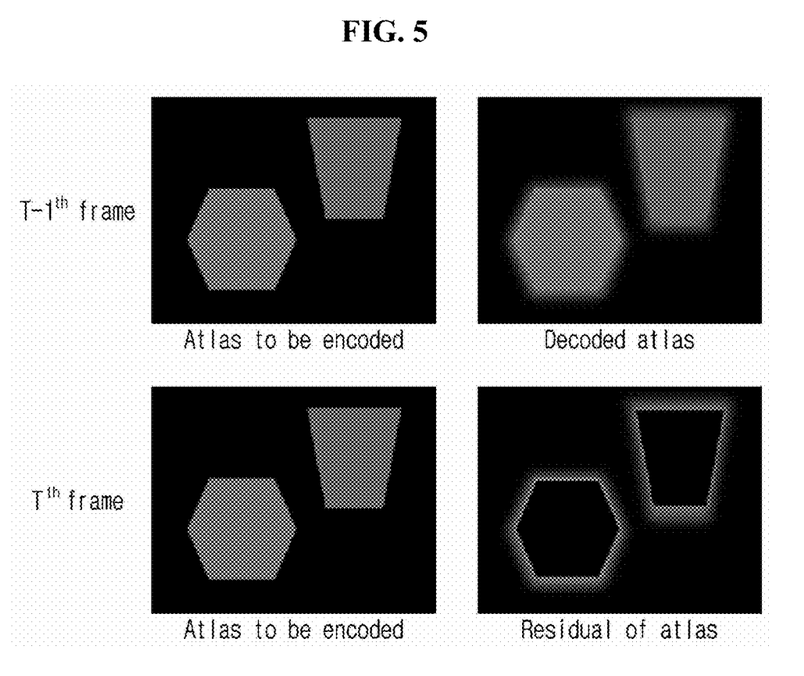
FIG. 5 is a view for describing a method for encoding an immersive image according to the related art.

FIG. 5 is a view for describing a method for encoding an immersive image according to the related art.

FIG. 5 illustrates an example of encoding temporally successive frames. The black region of FIG. 5 means an invalid region. In case the frame of time T−1 is encoded, a coding error may occur around a patch. In case the frame of time T is encoded by using the frame of time T−1 as a reference frame, such an error generates an additional residual signal when the frame of time T is encoded, and the additional residual signal leads to encoding of unnecessary information, thereby decreasing encoding efficiency.

Figure 6:
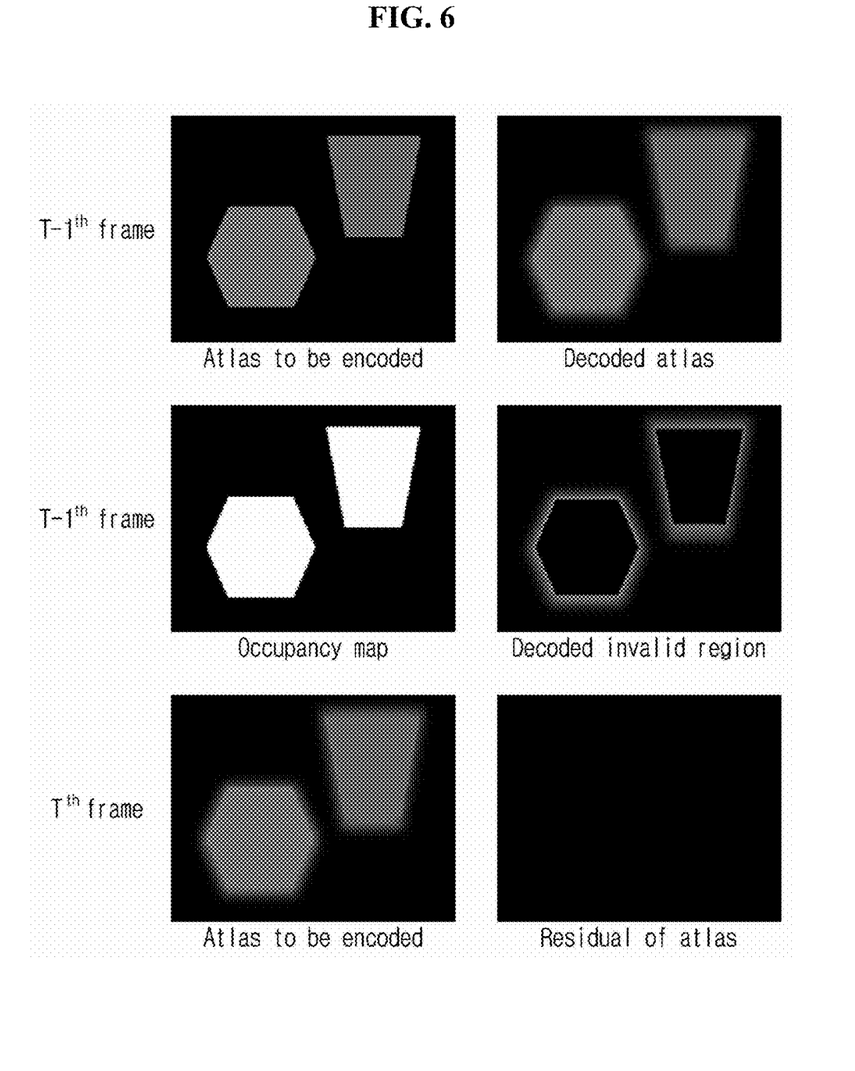
FIG. 6 is a view for describing a method for encoding/decoding an immersive image according to an embodiment of the present disclosure.

FIG. 6 is a view for describing a method for encoding/decoding an immersive image according to an embodiment of the present disclosure.

In order to solve the above-described problem, an immersive image encoding/decoding device may exclude a valid region of an atlas of time T−1 by masking occupancy map information of an atlas encoded/decoded at time T−1 on the atlas. As a masking result, an invalid region of the already encoded/decoded atlas of time T−1 may be extracted. Next, the immersive image encoding/decoding device may copy the extracted invalid region of time T−1 on an invalid region of an atlas image of time T. Specifically, the immersive image encoding/decoding device may set, among invalid regions in an atlas image of time T, a region overlapping with an invalid region in an atlas image of time T−1 to a prediction value of an invalid region in the atlas image of time T−1 or replace the overlapping region by an invalid region in the atlas image of time T−1. Thus, the immersive image encoding/decoding device may reduce information included in a residual signal of the atlas image of time T by referring to the encoded/decoded atlas of time T−1.

The method of setting an invalid region in an atlas of time T by copying an invalid region in an atlas of time T−1, which is proposed by the present disclosure, may be applied to at least one of an attribute atlas and a geometry atlas as a target.

Alternatively, in a unit of a predetermined region in an atlas, a method of copying an invalid region of a previous frame may be applied. Herein, the predetermined region may indicate at least one of a block, a coding tree unit (CTU), a slice, a tile, a tile group, a sub-picture, a picture, and a sequence.

Figure 7:
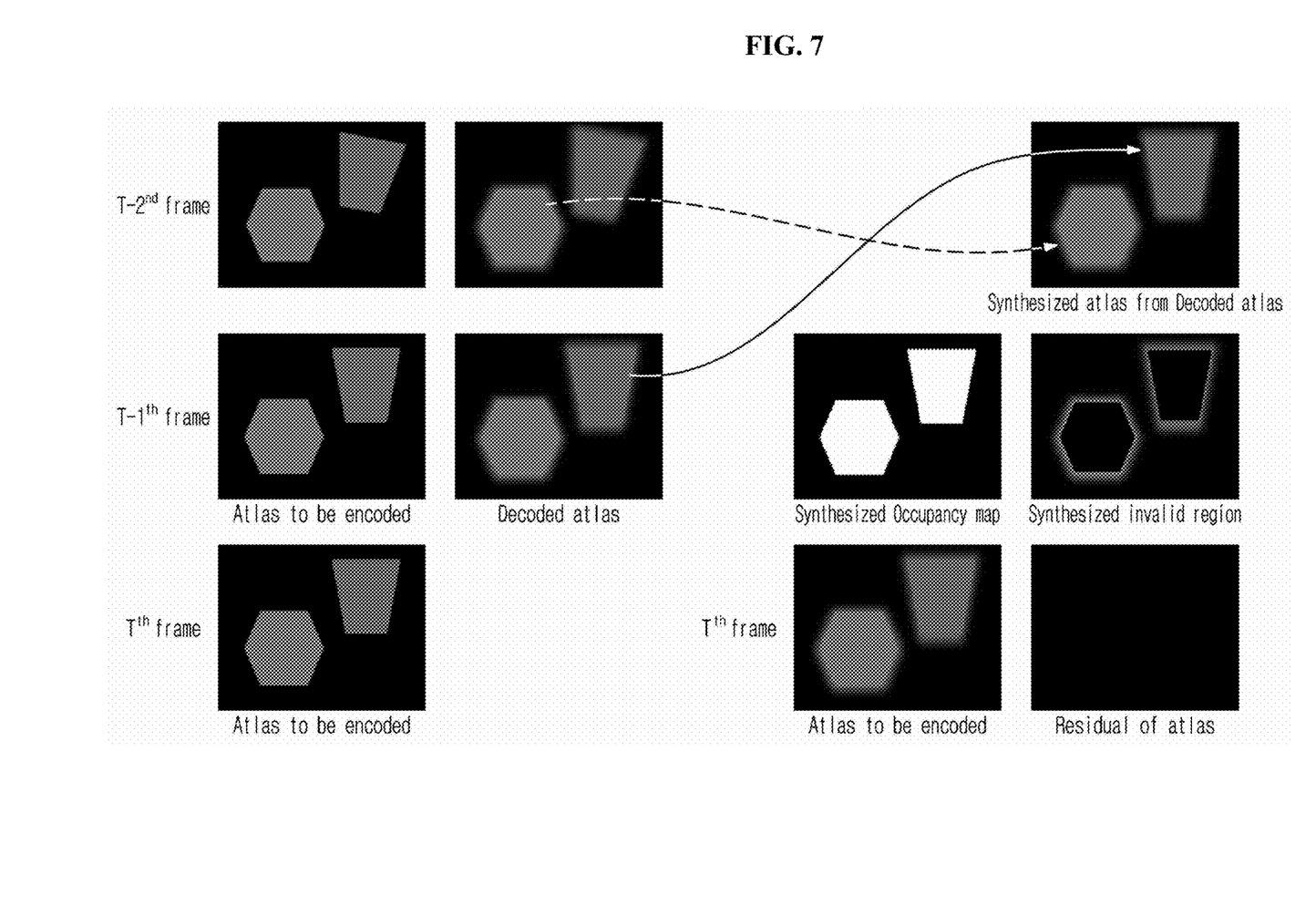
FIG. 7 is a view for describing a method for encoding/decoding an immersive image according to another embodiment of the present disclosure.

FIG. 7 is a view for describing a method for encoding/decoding an immersive image according to another embodiment of the present disclosure.

As another method for solving the above-described problem, an immersive image encoding/decoding device may copy a most similar patch among patches present in different frames and use it to encode/decode a current patch.

For example, a plurality of patches in a single frame may have a high similarity to each of patches present in different frames. As an example, referring to FIG. 7, a first patch and a second patch, which are included in a frame of time T, may have a high similarity to a patch of time T−2 and a patch of time T−1 respectively. In this case, the immersive image encoding/decoding device may copy an invalid region of the frame of time T by using, for each patch, a patch in a frame with a high similarity.

Figure 8:
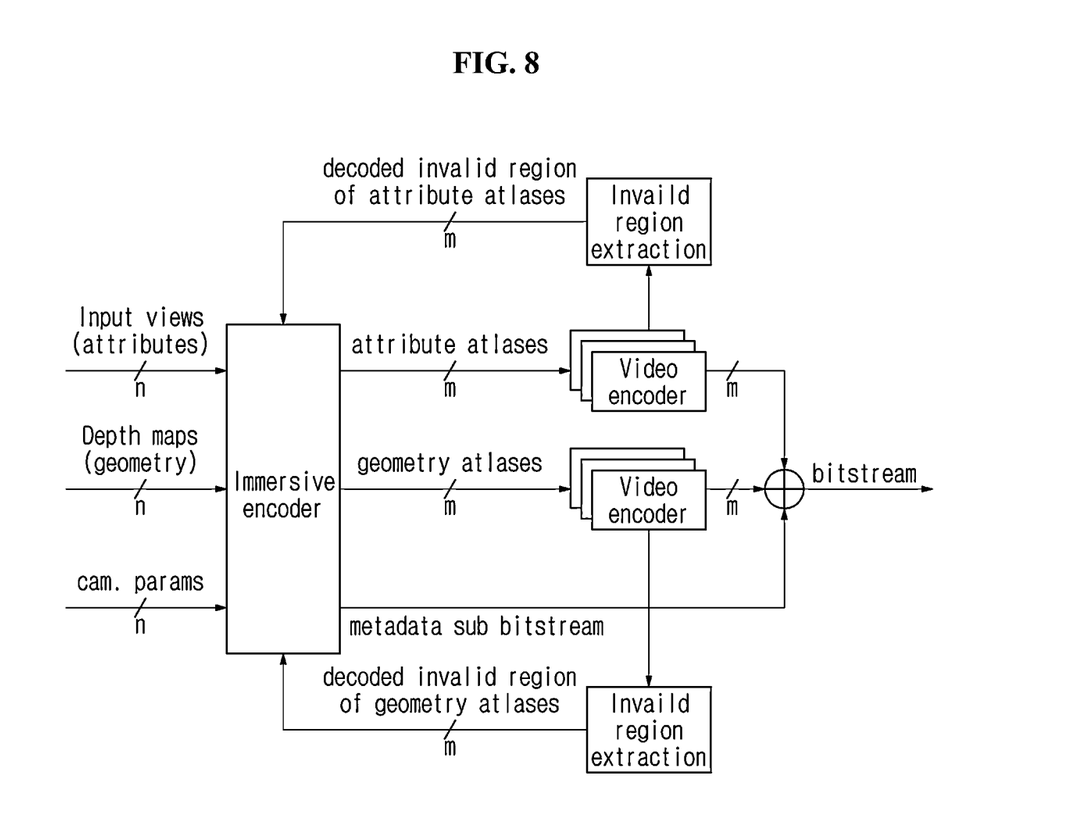
FIG. 8 is a view for describing an immersive image decoding device according to some embodiments of the present disclosure.

FIG. 8 is a view for describing an immersive image encoding device according to some embodiments of the present disclosure, and FIG. 8 is a view for describing an immersive image decoding device according to some embodiments of the present disclosure.

Figure 9:
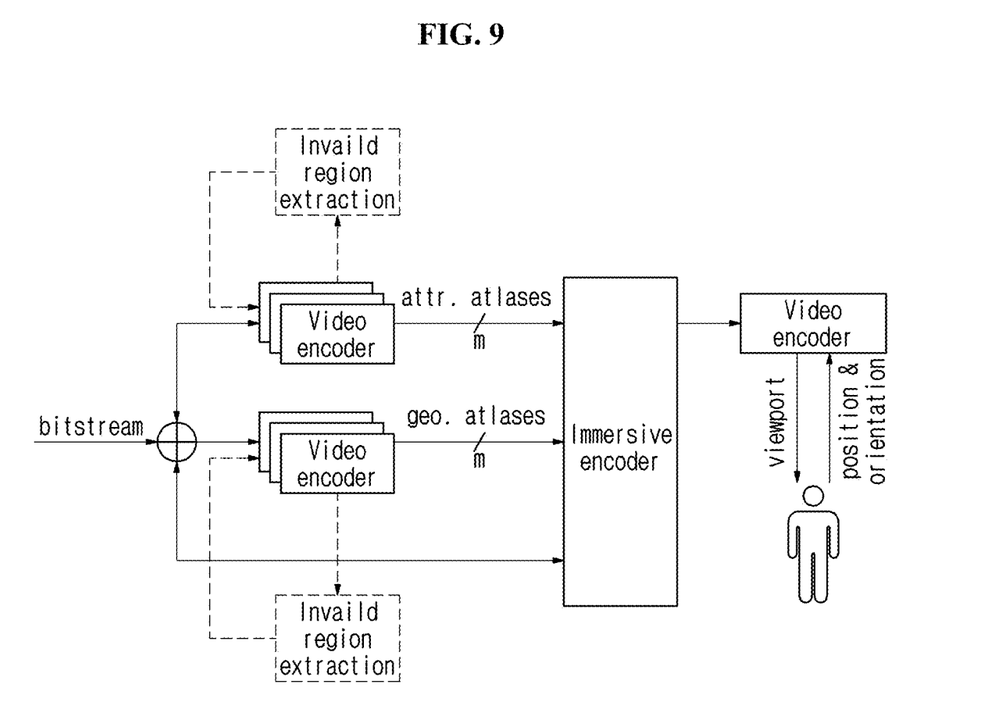
FIG. 9 to FIG. 12 are views for describing a syntax element that is applicable in a method for encoding/decoding an immersive image according to another embodiment of the present disclosure.

An immersive image encoding/decoding device of FIG. 8 and FIG. 9 may be an improvement of an immersive image encoding/decoding device of FIG. 2 and FIG. 3. Referring to FIG. 8, an immersive image encoding device may extract an invalid region of an already encoded atlas. Herein, the invalid region may be extracted based on a geometry atlas or occupancy map information of the already encoded atlas. Specifically, based on whether or not a depth value in the geometry atlas is smaller than a threshold value, an invalid region may be identified, or based on the occupancy map information, an invalid region not occupied by a patch may be identified. An invalid region thus extracted may be utilized to encode a current atlas in an immersive encoder. Extraction of an invalid region may be performed by an invalid region extraction module included in an immersive image encoding device. Meanwhile, an immersive region extraction module may further include an image decoder that decodes a two-dimensional image. Herein, a masked invalid region may be determined as an invalid region, which is derived from a frame that is first encoded in a unit of group of pictures (GOP), or as an invalid region that is derived from one of any already frames.

Alternatively, information identifying a reference frame, which is used to refer to an invalid region in each frame, may be explicitly signaled. As an example, a syntax element ref_idx may be defined. Herein, ref_idx may be information that identifies or indicates a reference frame used for referring to an invalid region of a current frame. In this case, a pixel value of an invalid region in the current frame may be set by referring to an occupancy state of an invalid region in the reference frame.

Invalid regions of a plurality of reference frames may be recursively masked. As an example, a value of an invalid region of a first reference frame may be copied into a region overlapping with the invalid region of the first reference frame among invalid regions of a current frame, and a value of an invalid region of a second reference frame may be copied into a region overlapping with the invalid region of the second reference frame among the invalid regions of the current frame. When an invalid region of a current frame overlaps both with an invalid region of a first reference frame and with an invalid region of a second reference frame, a value of an invalid region of a reference frame with a higher priority between the first reference frame and the second reference frame may be copied. When an invalid region of a current frame overlaps both with an invalid region of a first reference frame and with an invalid region of a second reference frame, a value of an invalid region in the current frame may be derived through an average or weighted sum of a value of the invalid region of the first reference frame and a value of the invalid region of the second reference frame.

In this case, a same operation may be performed in an image decoder.

Referring to FIG. 9, extraction of an invalid region may be performed by an invalid region extraction module included in an immersive image decoding device. As example, extraction of an invalid region, which is performed in an invalid region extraction module, may be performed only when a predefined condition is satisfied. When an operation of invalid region extraction is performed, a decoded invalid region should be reflected in constructing a reference frame. However, in a specific case like partial bitstream parsing, a decoding module may not refer to an invalid region of a previous frame when constructing a reference frame. In consideration of the above problem, although reference screen update can be of help to improve coding efficiency, it may be selectively performed since it should be performed in an immersive encoding device and an immersive decoding device in a same way.

As another example, when a first frame of an image is encoded/decoded, since there may be no invalid region that is extracted in advance, a conventional background filling technique may be used only for this case. After encoding/decoding the first frame, encoding/decoding may be performed by using an invalid region of an already encoded/decoded frame.

Figure 10:
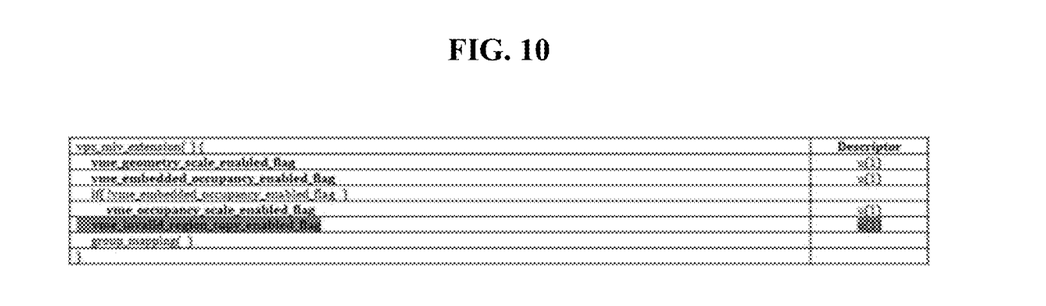
Figure 11:
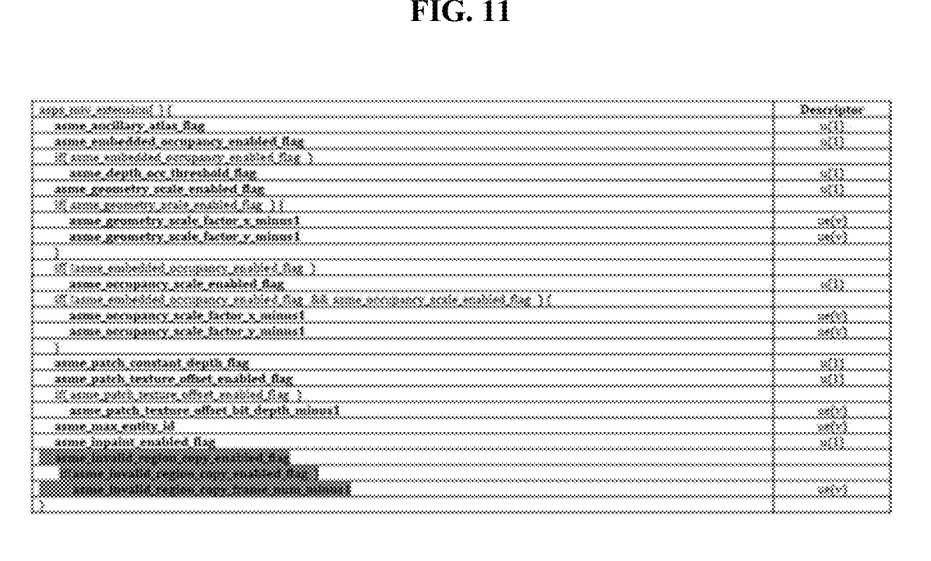
Figure 12:
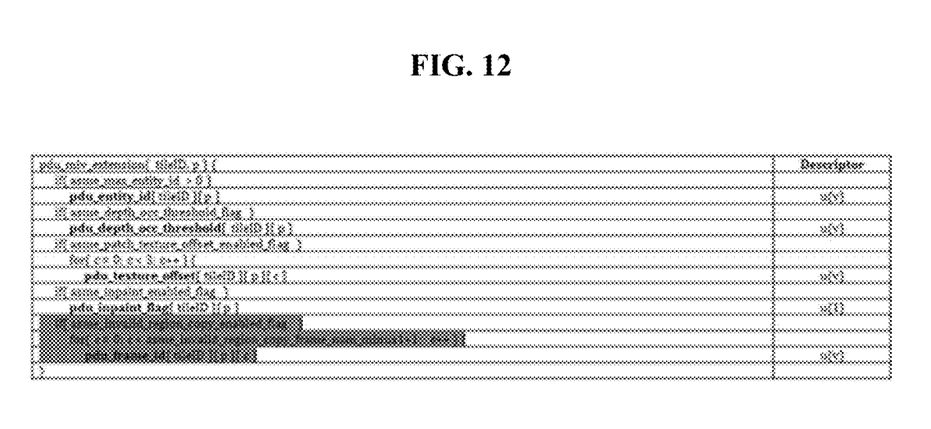

FIG. 10 to FIG. 12 are views for describing a syntax element that is applicable in a method for encoding/decoding an immersive image according to another embodiment of the present disclosure.

As an example, in an immersive encoding device and an immersive decoding device, information indicating whether or not to perform an invalid region extraction operation may be defined. Herein, the information indicating whether or not to perform an invalid region extraction operation may be defined in a form of flag syntax. As an example, the information indicating whether or not to perform an invalid region extraction operation may be defined as invalid_region_copy_flag or invalid_region_copy_enabled_flag, but the scope of the present disclosure is not limited to these syntax names. The information may be signaled in an image unit. Alternatively, information indicating whether or not to perform an invalid region extraction operation may be signaled in a unit of a predetermined region. Herein, the predetermined region may be at least one of a block, a coding tree unit (CTU), a slice, a tile, a tile group, a sub-picture, a picture, and a sequence.

Specifically, invalid_region_copy_flag may be signaled through vps_miv_extension or a video parameter set, as illustrated in FIG. 10, or may be signaled through asps_miv_extension_miv_extension or an atlas sequence parameter set, as illustrated in FIG. 11. In each case, a syntax element may be defined as vme_invalid_region_copy_enabled_flag and aspe_invalid_region_copy_enabled_flag. Meanwhile, the above-described vps_miv_extension and asps_miv_extension_miv_extension may mean V3C parameter set MIV extension syntax and atlas sequence parameter set MIV extension syntax respectively.

When invalid_region_copy_flag is signaled through an atlas sequence parameter set, an allowable number of frames may be defined to define a frame ID for each of a plurality of patches. For example, an allowable number of frames in a current atlas may be signaled by asme_invalid_region_copy_frame_num_minus1. Specifically, asme_invalid_region_copy_frame_num_minus1 may be a value obtained by subtracting 1 from an allowable number of frames in a current atlas.

As another example, as illustrated in FIG. 12, a syntax element defining a frame in which a most similar patch to each patch is located may be defined. As an example, information indicating a frame in which each patch is located may be defined as frame_id. Herein, frame_id may be signaled through pdu_miv_extension or patch data. Meanwhile, herein, pdu_miv_extension may mean a patch data unit MIV extension syntax. When frame_id is signaled through pdu_miv_extension, a syntax element may be defined as pdu_frame_id.

As an example, pdu_frame_id may be signaled only when the above-described asme_invalid_region_copy_enabled_flag is 1. Meanwhile, a syntax element defined at a patch data level may also be signaled at an SEI level.

As yet another example, an invalid region extraction operation may be performed only when an occupancy map for determining valid and invalid regions is explicitly encoded/decoded. As an example, when occupancy information is embedded in a geometry atlas (that is, an occupancy state of a pixel is determined by comparing a depth value with a threshold value), an invalid region extraction operation may be omitted. On the other hand, when an occupancy map for determining an occupancy state of a geometry atlas is explicitly encoded/decoded, an invalid region extraction operation may be performed by using the occupancy map as a mask image.

For the purpose of convenience, the present specification describes that the above-described embodiment is applicable to an immersive image, but the embodiments of the present disclosure are applicable to every type of images encoded/decoded in an atlas form. Furthermore, the embodiments of the present disclosure are applicable to various types of image encoding/decoding devices that encode/decode an image by distinguishing a valid region and an invalid region.

Figure 13:
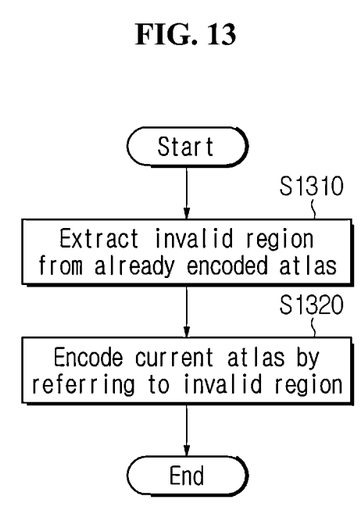
FIG. 13 is a view for describing a method for encoding an immersive image according to some embodiments of the present disclosure.

FIG. 13 is a view for describing a method for encoding an immersive image according to some embodiments of the present disclosure.

Referring to FIG. 13, according to an embodiment of the present disclosure, a method for encoding an immersive image may include extracting an invalid region from an already encoded atlas (S1310) and encoding a current atlas by referring to the invalid region (S1320).

Herein, the extracting of the invalid region (S1310) may include obtaining occupancy map information of the already encoded atlas and excluding a valid region of the already encoded atlas by masking the occupancy map information.

In addition, the encoding of the current atlas (S1320) may include copying the extracted invalid region of the already encoded atlas into an invalid region of the current atlas.

Figure 14:
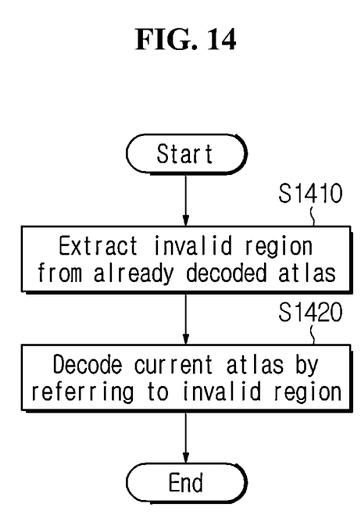
FIG. 14 is a view for describing a method for decoding an immersive image according to some embodiments of the present disclosure.

FIG. 14 is a view for describing a method for decoding an immersive image according to some embodiments of the present disclosure.

Referring to FIG. 14, according to an embodiment of the present disclosure, a method for decoding an immersive image may include extracting an invalid region from an already decoded atlas (S1410) and decoding a current atlas by referring to the invalid region (S1420).

Herein, the extracting of the invalid region (S1410) may include obtaining occupancy map information of the already decoded atlas and excluding a valid region of the already decoded atlas by masking the occupancy map information.

In addition, the decoding of the current atlas (S1420) may include copying the extracted invalid region of the already decoded atlas into an invalid region of the current atlas.

In the above-described embodiments, the methods are described based on the flowcharts with a series of steps or units, but the present disclosure is not limited to the order of the steps, and rather, some steps may be performed simultaneously or in different order with other steps. In addition, it should be appreciated by those skilled in the art that the steps in the flowcharts are not exclusive and that other steps may be added to the flowcharts or some of the steps may be deleted from the flowcharts without influencing the scope of the present disclosure.

The above-described embodiments include various aspects of examples. All possible combinations for various aspects may not be described, but those skilled in the art will be able to recognize different combinations. Accordingly, the present disclosure may include all replacements, modifications, and changes within the scope of the claims.

The embodiments of the present disclosure may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks and magnetic tapes; optical data storage media such as CD-ROMs and DVD-ROMs; magneto-optimum media like floptical disks; and hardware devices, such as read-only memory (ROM), random-access memory (RAM), flash memory, etc., which are particularly structured to store and implement program instructions. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present disclosure has been described in terms of specific items such as detailed elements as well as the limited embodiments and the drawings, they are only provided to help more general understanding of the present disclosure, and the present disclosure is not limited to the above embodiments. It will be appreciated by those skilled in the art to which the present disclosure pertains that various modifications and changes may be made from the above description.

Therefore, the spirit of the present disclosure shall not be limited to the above-described embodiments, and the entire scope of the appended claims and their equivalents will fall within the scope and spirit of the present disclosure.

What is claimed is:

1. A method for encoding an immersive image, the method comprising:
classifying each of multiple views into either a basic view or an additional view;
deriving patches from the additional view;
generating a current atlas based on the patches; and
encoding the current atlas,
wherein the current atlas is constituted of a valid region filled with valid pixels and an invalid region filled with invalid pixels,
wherein an overlapped region, that overlap with an invalid region of a reference atlas, within the invalid region of the current atlas is replaced by the invalid region of the reference atlas, and
wherein in response to the overlapped region of the current atlas is overlapped with two reference atlases, one of the two reference atlases that has a higher priority than the other is used to replace the overlapped region of the current atlas.

2. The method of claim 1, wherein a threshold depth value, validity of a pixel in the current atlas is determined by comparing a depth value corresponding to the pixel with a threshold depth value.

3. The method of claim 1, wherein information indicating whether the current atlas is encoded with replacing the overlapped region by the reference atlas is encoded into a bitstream.

4. A method for decoding an immersive image, the method comprising:
determining at least one reference atlas of a current atlas; and
decoding the current atlas based on the reference atlas, wherein the current atlas is constituted of a valid region filled with valid pixels and an invalid region filled with invalid pixels, wherein an overlapped region, that overlap with an invalid region of a reference atlas, within the invalid region of the current atlas is decoded by copying the invalid region of the reference atlas, and wherein in response to the overlapped region of the current atlas is overlapped with two reference atlases, one of the two reference atlases that has a higher priority than the other is used to decode the overlapped region of the current atlas.

5. The method of claim 4, wherein validity of a pixel in the current atlas is determined by comparing a depth value corresponding to the pixel with a threshold depth value.

6. The method of claim 4, wherein whether the overlapped region of the current atlas is decoded by copying the invalid region of the reference atlas or not is determined based on information decoded from a bitstream.

7. A non-transitory computer-readable recording medium storing program instructions when executed cause a computer carrying out:

classifying each of multiple views into either a basic view or an additional view;

deriving patches from the additional view;

generating a current atlas based on the patches; and encoding the current atlas, wherein the current atlas is constituted of a valid region filled with valid pixels and an invalid region filled with invalid pixels, wherein an overlapped region, that overlap with an invalid region of a reference atlas, within the invalid region of the current atlas is replaced by the invalid region of the reference atlas, and wherein in response to the overlapped region of the current atlas is overlapped with two reference atlases, one of the two reference atlases that has a higher priority than the other is used to replace the overlapped region of the current atlas.

* * * * *